Sept. 25, 1956     E. HARTMANN     2,764,191
DOVE-TAIL TEMPLATE
Filed Aug. 18, 1953     4 Sheets-Sheet 1
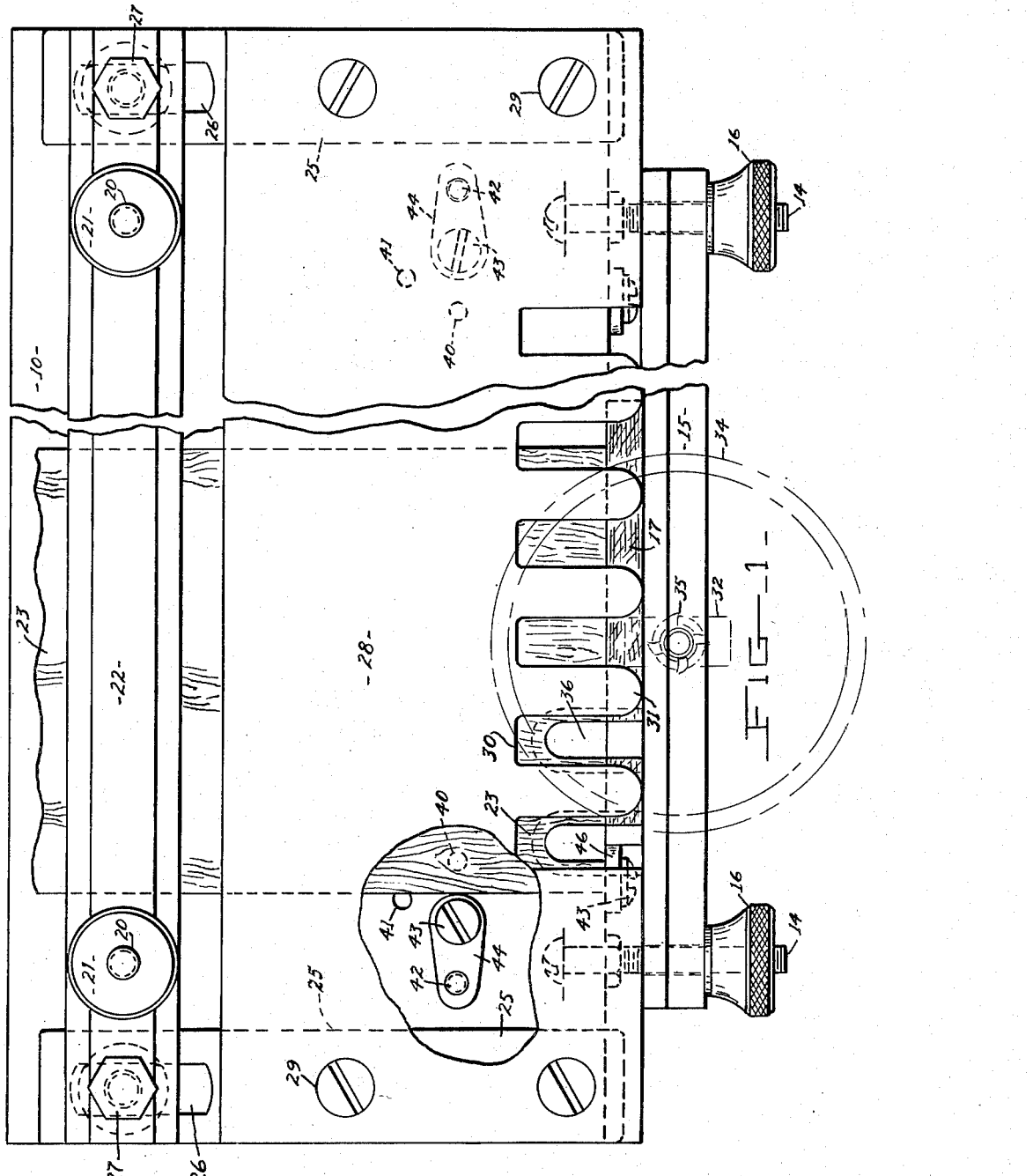
INVENTOR.
Eric Hartmann
BY
D. Emmett Thompson
ATTORNEY

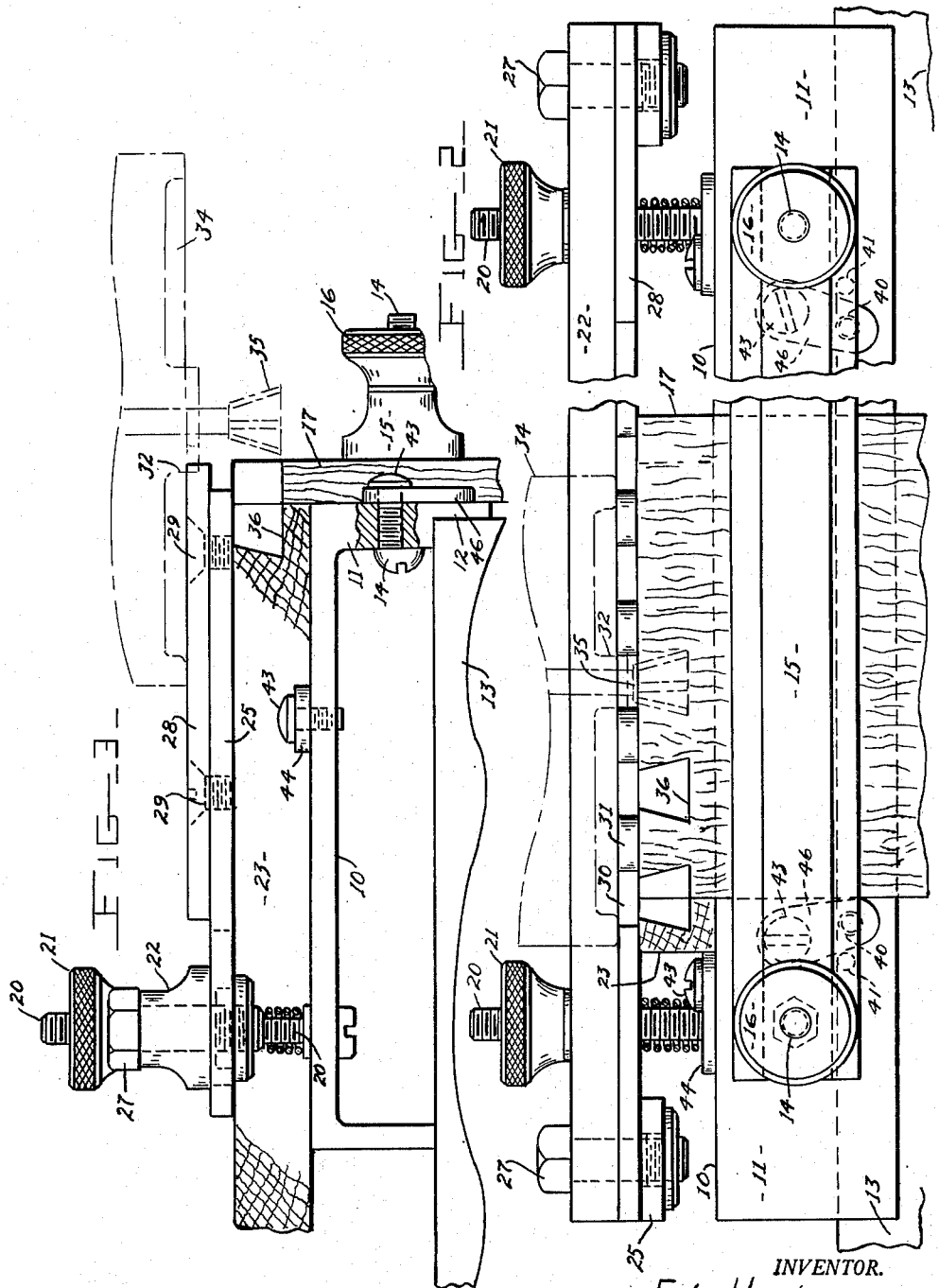

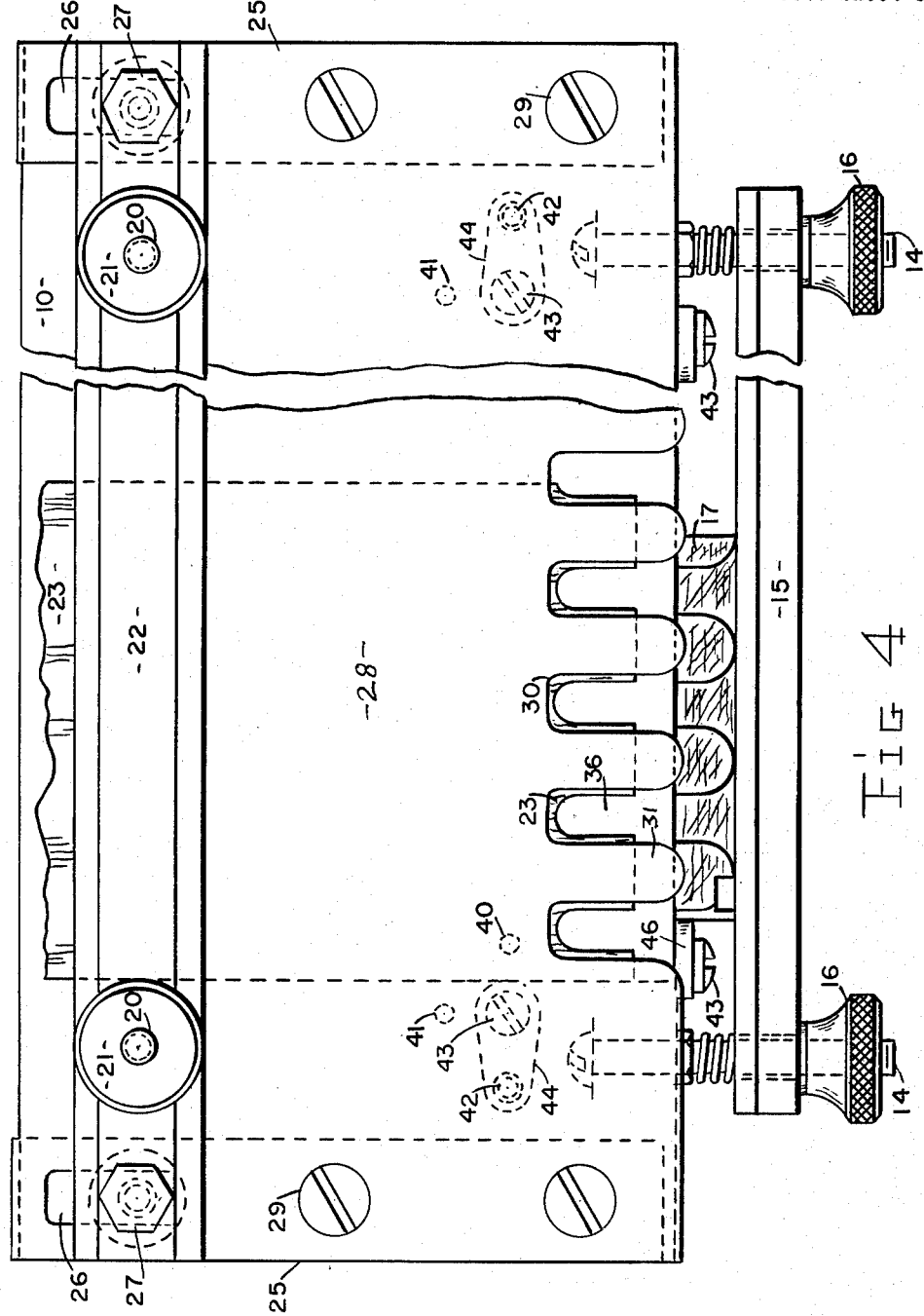

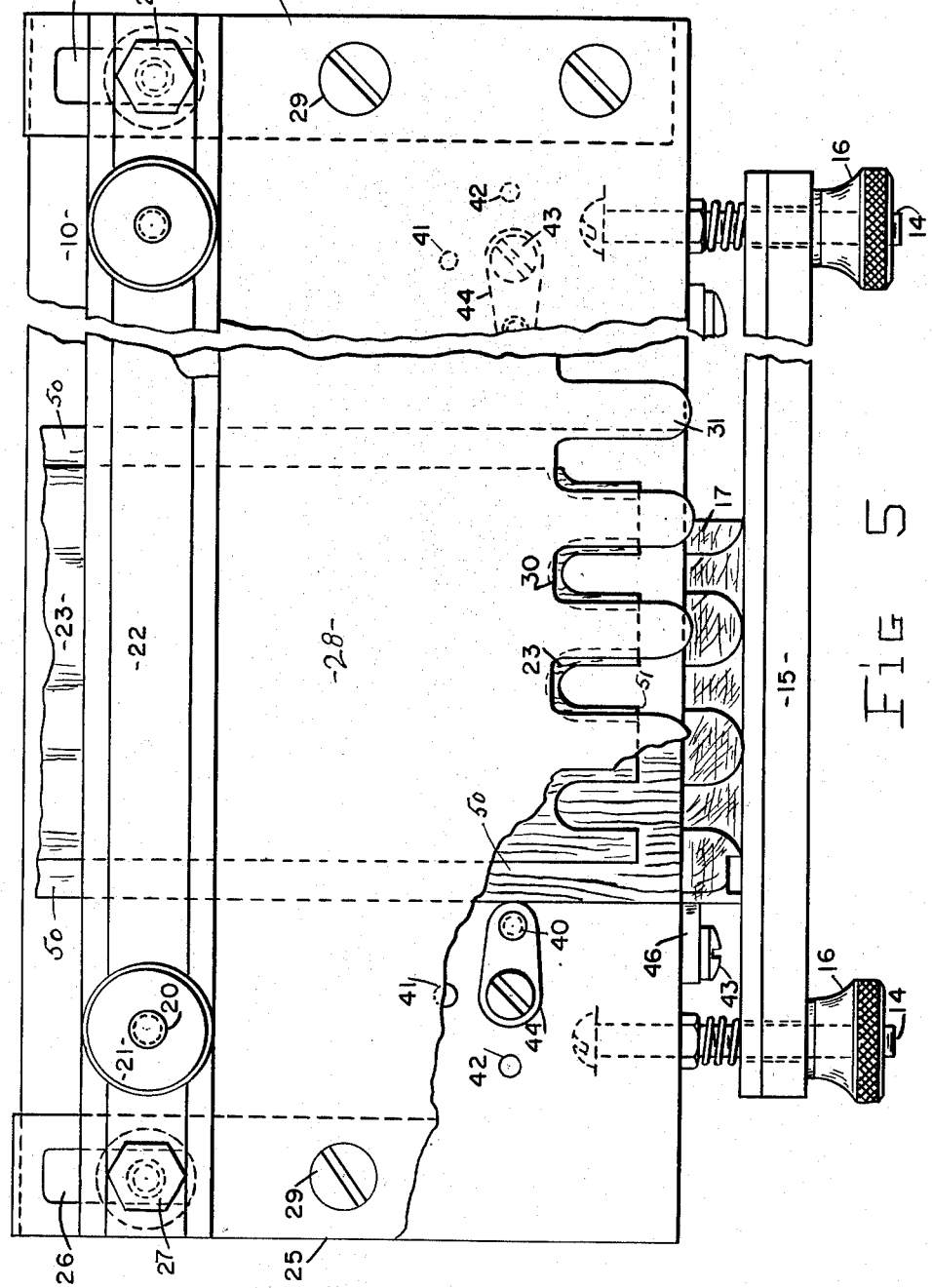

United States Patent Office 2,764,191
Patented Sept. 25, 1956

2,764,191

DOVE-TAIL TEMPLATE

Eric Hartmann, Syracuse, N. Y., assignor to The Porter-Cable Machine Company, Syracuse, N. Y., a corporation of New York Application August 18, 1953, Serial No. 374,970

2 Claims. (Cl. 144—87)

This invention relates to a fixture employed in cutting dove-tail joint structures, such as is commonly employed in the making of drawers, boxes, etc.

More particularly it has to do with that type of fixture wherein the two work pieces are clamped in perpendicular relation to each other and the dove-tail mortises and tenons are cut simultaneously in both work pieces by a hand manipulated routing machine which is guided by a template forming part of the fixture.

This invention has as an object a dove-tail template fixture of the type referred to embodying a structural arrangement whereby the template may be conveniently adjusted for varying the extent of the cutting in a direction transversely of the top edge of the vertically clamped work piece—that is, to vary the depth of the sockets or mortises formed in the horizontally clamped work piece, whereby the same may be formed with a rabbet to provide a portion overhanging the end edge of the other piece as, for example, providing a drawer front with the end portions extending laterally beyond the side members of the drawer.

The invention has as a further object a work positioning structure by which the work piece may be quickly and conveniently adjusted corresponding to the size of the mortises and tenons being cut.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a top plan view of a dove-tail fixture embodying my invention with a portion of the template broken away.

Figure 2 is a front elevational view.

Figure 3 is an end elevational view looking to the right, Figure 1.

Figure 4 is a top plan view of the fixture with the template positioned to accommodate a work piece formed with a rabbet along the dove tail edge.

Figure 5 is a top plan view with a portion of the template broken away showing the position of the parts with the upper work piece formed with a rabbet on all edges.

The fixture consists of a base 10 having a front edge wall portion 11 which is preferably formed with a rabbet to provide a depending portion 12 to engage the front edge of a bench 13 on which the base is positioned.

The front leg 11 of the base is provided with two spaced apart screws 14 for receiving a clamp bar 15 which functions, with the aid of hand nuts 16, to clamp a work piece 17 against the vertical surface of the front leg 11 of the base. The base is provided adjacent its rear edge with a pair of spaced apart screws 20 having hand nuts 21 for moving a second clamp bar 22 downwardly to clamp the second work piece 23 against the horizontal top wall of the base.

The upper clamp bar 22 extends laterally from the screws 20 and there is attached to each end portion of this clamp bar a supporting bar 25. These supporting bars 25 are formed with elongated slots 26 to receive cap screws 27, and these bars serve to support a template 28 attached to the bars by screws 29.

The forward edge of the template is formed with a series of slots 30 providing a series of teeth or fingers 31. The finger formation on the forward edge of the plate is engaged by a guide member 32 carried by a power operated router 34 provided with a conical shaped cutting bit 35. The router is supported by the template 28, and the cutter bit 35 is adjusted to cut the proper depth in the horizontal work piece 23. As the router is guided by the template, the bit is moved through the end portion of the vertical work piece 17 into the confronting edge of the work piece 23, it being only necessary for the operator to maintain the guide member 32 in contact with the fingers 31, moving the router in and out and lengthwise of the fixture until both work pieces have been formed with slots 36 throughout their width.

In order to have the side edges of the finished work pieces meet in registration when assembled, it is necessary to clamp one work piece in offset relation relative to the other work piece, as shown in Figure 2, wherein the vertical work piece 17 is offset to the right from the horizontal work piece 23. The amount of this offset depends upon the size of the cutter being used—that is, upon the width of the mortises and tenons.

Both the horizontal and vertical work supporting surfaces of the base are provided with work positioning members which are quickly and conveniently adjustable for positioning the work pieces in the proper offset relation. The top or horizontal work supporting surface is provided with three depressions or apertures 40, 41 and 42. In the arrangement shown, these depressions are laid out an equal radii from the axis of a screw 43 on which the work positioning member 44 is pivotally mounted and which is provided, adjacent its free end, with a projection which may be in the form of a pin. Upon loosening the screw 43 and slightly raising the member 44, it can be moved about the axis of the screw and the projection on the under side of the member 44 positioned in any one of the depressions 40, 41, 42. If the member 44 is moved in a clockwise direction, Figure 1, with the projection positioned in the depression 41, the work piece 23 will be moved to the right a short distance. If the member 44 is rotated to bring the projection into the depression 40, the work piece will be moved a considerable distance to the right. When the positioning member 44 has been moved to a selected one of the positions, the screw 43 is tightened, whereby the positioning member is firmly clamped to the base against any movement relative thereto.

The front wall 11 of the base is provided with a similar arrangement, the work positioning member being indicated at 46. In the actual construction, the positioning members 44, 46, are of such form that when both of these members are moved to the same selected position, the work pieces will be properly offset for a given size router bit, it being only necessary that the operator positions the work pieces against the work positioning members prior to actuating the clamp bars 15, 22.

The depressions 41 and 42 are to accommodate two different sizes of router bits and the depression 40, in the horizontal work supporting surface, is to provide additional widthwise spacing of the work piece 23, when the latter has a rabbet 50 formed along its side edge. That is, the work positioning members 44, 46, not only provide for the proper widthwise displacement of the horizontal work pieces for different size cutter bits but also the member 44 may be adjusted to provide a further displacement by the width of the rabbet 50.

As previously stated, the fixture may be conveniently adjusted to accommodate the top work piece 23 when it is formed with a rabbet extending along the end edge of the piece. This is often done to provide the work piece, such as a drawer front, with end portions which extend laterally beyond the opening in which the drawer is mounted. In this instance, the dove-tailed slots 36 are positioned inwardly from the end edge of the work piece, as shown in Figure 4 of the drawings. To cut the dove-tail in these work pieces, the template plate 28 is initially positioned as shown in Figure 1 for the cutting of the slots 36 through the upper edge of the work piece 17. The nuts 27 are then loosened and the template plate pushed rearwardly against the bar 22 and again clamped in this position, as shown in Figure 5. The slotted vertical work piece 17 is then removed from the fixture and the upper work piece 23 is then slotted, these slots extending inwardly from the rabbet edge 51 the same depth as the slots extend in from the edge of the un-rabbeted work piece in Figure 1.

When the top work piece 23 is rabbeted as at 50 along its side edges, the positioning member 44 is moved to arrange its projection in the depression 40, as illustrated in Figure 5. This effects shifting of the upper work piece so that the slots 36 formed therein will be arranged in proper registration with the projections formed on the vertical work piece 17.

It will be apparent that the fixture provides for accommodating the various types of drawer fronts in use, the structure being so arranged that the adjustments necessary for accommodating different work pieces can be quickly and conveniently made.

What I claim is:

1. A dove-tail template fixture comprising a base having horizontal and vertical work supporting surfaces, a first work clamp operable to clamp a work piece against said vertical surface, a second work clamp operable to clamp a work piece on said horizontal surface in abutting relation to said first work piece, a cutter guiding template plate mounted on said second clamp for adjustment toward and from said first work piece and being formed along one edge with a series of fingers overlying the abutting portions of the work pieces, means operable to detachably secure said template to said second clamp in any position of adjustment of said template, a work positioning member pivotally mounted on each of said surfaces, said members being movable about their pivots to position the work pieces in different positions in a direction lengthwise of said series of fingers, and means operable to clamp said members to the surfaces in a selected one of said positions.

2. A dove-tail template fixture comprising a base having horizontal and vertical work supporting surfaces, a first work clamp operable to clamp a work piece against said vertical surface, a second work clamp operable to clamp a work piece on said horizontal surface in abutting relation to said first work piece, a cutter guiding template plate mounted on said second clamp for adjustment toward and from said first work piece and being formed along one edge with a series of fingers overlying the abutting portions of the work pieces, means operable to detachably secure said template to said second clamp in any position of adjustment of said template, a work positioning member mounted on each of said surfaces for movement into different positions and being operable to position the work pieces in different positions in a direction lengthwise of said series of fingers, said members and surfaces having interlocking projections and depressions, and means for clamping said members to the surfaces in a selected one of said positions.

References Cited in the file of this patent

UNITED STATES PATENTS

| 1,227,156 | Koehler | May 22, 1917 |
| 1,357,970 | Felland | Nov. 9, 1920 |
| 1,569,236 | Puterbaugh | Jan. 12, 1926 |
| 1,651,510 | Carter | Dec. 6, 1927 |
| 2,260,662 | Farrell | Oct. 28, 1941 |